United States Patent
Chen et al.

(10) Patent No.: US 12,431,811 B2
(45) Date of Patent: Sep. 30, 2025

(54) ISOLATED SWITCHING CONVERTER WITH TWO ISOLATED CHANNELS AND CONTROL METHOD THEREOF

(71) Applicant: Hangzhou MPS Semiconductor Technology, Ltd., Hangzhou (CN)

(72) Inventors: Xuefeng Chen, Hangzhou (CN); Hui Li, Hangzhou (CN)

(73) Assignee: Hangzhou MPS Semiconductor Technology, Ltd., Zhejiang (CN)

( * ) Notice: Subject to any disclaimer, the term of this patent is extended or adjusted under 35 U.S.C. 154(b) by 232 days.

(21) Appl. No.: 18/462,704

(22) Filed: Sep. 7, 2023

(65) Prior Publication Data

US 2024/0113630 A1   Apr. 4, 2024

(30) Foreign Application Priority Data

Sep. 29, 2022   (CN) .................. 202211230974.X (51) Int. Cl.
*H02M 3/335*   (2006.01)
*H02M 1/00*    (2006.01)
*H02M 1/08*    (2006.01)

(52) U.S. Cl.
CPC ..... *H02M 3/33515* (2013.01); *H02M 1/0009* (2021.05); *H02M 1/083* (2013.01); *H02M 3/33523* (2013.01)

(58) Field of Classification Search
CPC .......... H02M 3/33515; H02M 1/0009; H02M 3/33523; H02M 1/0058; H02M 3/33592; H02M 1/08; H02M 3/01; H02M 3/33576; Y02B 70/10
See application file for complete search history.

(56) References Cited

U.S. PATENT DOCUMENTS

| | | | |
|---|---|---|---|
| 9,407,155 B2* | 8/2016 | Wang | H02M 3/33592 |
| 2011/0103104 A1* | 5/2011 | Zhan | H02M 3/33507 |
| | | | 363/21.17 |
| 2016/0352231 A1* | 12/2016 | Quigley | H02M 1/36 |
| 2022/0103078 A1* | 3/2022 | Fan | H02M 1/0009 |
| 2022/0209665 A1 | 6/2022 | Li et al. | |
| 2022/0209676 A1 | 6/2022 | Li et al. | |
| 2023/0188033 A1 | 6/2023 | Chen et al. | |
| 2023/0188046 A1 | 6/2023 | Chen et al. | |
| 2024/0039389 A1* | 2/2024 | Chen | H02M 1/0009 |
| 2024/0113629 A1* | 4/2024 | Chen | H02M 3/33523 |
| 2024/0113632 A1* | 4/2024 | Li | H02M 3/33592 |

* cited by examiner

*Primary Examiner* — Kyle J Moody
(74) *Attorney, Agent, or Firm* — Perkins Coie LLP (57) ABSTRACT

A controller used in an isolated switching converter having a transformer, a primary switch and a secondary switch. The controller has an error amplifying circuit, a control generator and an isolation circuit. The error amplifying circuit generates a first compensation signal based on the difference between a reference voltage and an output feedback signal. The control generator generates a first and second control signals based on the first compensation signal. The isolation circuit has a first channel for providing a first synchronous signal electrically isolated from the first control signal, for controlling a peak value of a current flowing through the primary switch, and has a second channel for providing a second synchronous signal electrically isolated from the second control signal, for controlling the switching frequency of the primary switch.

20 Claims, 8 Drawing Sheets

ISOLATED SWITCHING CONVERTER WITH TWO ISOLATED CHANNELS AND CONTROL METHOD THEREOF

CROSS-REFERENCE TO RELATED APPLICATIONS

This application claims the benefit of CN application 202211230974.X, filed on Sep. 29, 2022, and incorporated herein by reference.

TECHNICAL FIELD OF THE INVENTION

The present invention generally relates to electronic circuits, and more particularly but not exclusively, to isolated switching converters with two isolated channels and associated control methods.

BACKGROUND OF THE INVENTION

Isolated switching power supplies are widely used in off-line power supply systems. Isolated switching converter usually include a transformer with a primary winding and a secondary winding for providing an isolation. A primary switch is coupled to the primary winding, and the energy stored in the primary winding is transferred to the secondary winding. A secondary switch is coupled to the secondary winding to provide a regulated output voltage for a load coupled to an output of a secondary side. In the isolated switching converter with peak current control, when a current flowing through the primary switch is increased to reach a turning-off threshold, the primary switch is turned off, and thus controlling the energy delivered to the load. Owing to the fixed turning-off threshold, the efficiency will be poor in the light load. As a result, the turning-off threshold should be adaptive and vary with the change of load. However, in the isolated switching power supply without opto-coupler as isolation, how to implement communication between the secondary side and the primary side for transmitting the load information will be a problem to be solved.

SUMMARY OF THE INVENTION

An embodiment of the present invention discloses a controller used in an isolated switching converter, the isolated switching converter has a transformer having a primary winding and a secondary winding, a primary switch coupled to the primary winding and a secondary switch coupled to the secondary winding. The controller comprises an error amplifying circuit, a control generator, an isolation circuit, a threshold generator, a peak comparison circuit and a primary logic circuit. The error amplifying circuit is configured to generate a first compensation signal based on the difference between a reference voltage and an output feedback signal indicative of an output signal of the isolated switching converter. The control generator is configured to respectively generate a first control signal and a second control signal based on the first compensation signal. The isolation circuit has a first channel to transmit the first control signal and a second channel to transmit the second control signal, and further has a first output terminal for providing a first synchronous signal electrically isolated from the first control signal and a second output terminal for providing a second synchronous signal electrically isolated from the second control signal. The threshold generator is coupled to the first output terminal of the isolation circuit to receive the first synchronous signal and generate a first threshold voltage based on the first synchronous signal. The peak comparison circuit is configured to compare a current sense signal indicative of a current flowing through the primary switch and the first threshold voltage and to generate a turning-off control signal. The primary logic circuit is configured to receive the second synchronous signal and the turning-off control signal and to provide a primary control signal for controlling the primary switch based on the second synchronous signal and the turning-off control signal.

Another embodiment of the present invention discloses an isolated switching converter. The switching converter comprises a primary switch coupled to a primary winding of a transformer, a secondary switch coupled to a secondary winding of the transformer, and the controller described before.

Yet another embodiment of the present invention discloses a control method used in an isolated switching converter. The isolated switching converter has a primary switch coupled to a primary winding of a transformer, a secondary switch coupled to a secondary winding of the transformer, and an isolation circuit. The control method comprises the following steps. An output feedback signal indicative of an output signal of the isolated switching converter is provided. Based on the difference between a reference voltage and the output feedback signal, a first compensation signal is provided. Based on the first compensation signal, a first control signal and a second control signal are generated. The first control signal is transmitted to a first channel of the isolation circuit to provide a first synchronous signal electrically isolated from the first control signal. The second control signal is transmitted a second channel of the isolation circuit to provide a second synchronous signal electrically isolated from the second control signal. A first threshold voltage for controlling a peak value of a current flowing through the primary switch is generated based on the first synchronous signal. A turning-on control signal is generated for controlling the switching frequency of the primary switch based on the second synchronous signal.

BRIEF DESCRIPTION OF DRAWINGS

The present invention can be further understood with reference to the following detailed description and the appended drawings, wherein like elements are provided with like reference numerals.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

The present invention can be used in any isolated switching converter with soft switching. In the following detailed description, for the sake of brevity, only a flyback converter is taken as an example to explain and describe the working principle of the present invention.

Figure 1:
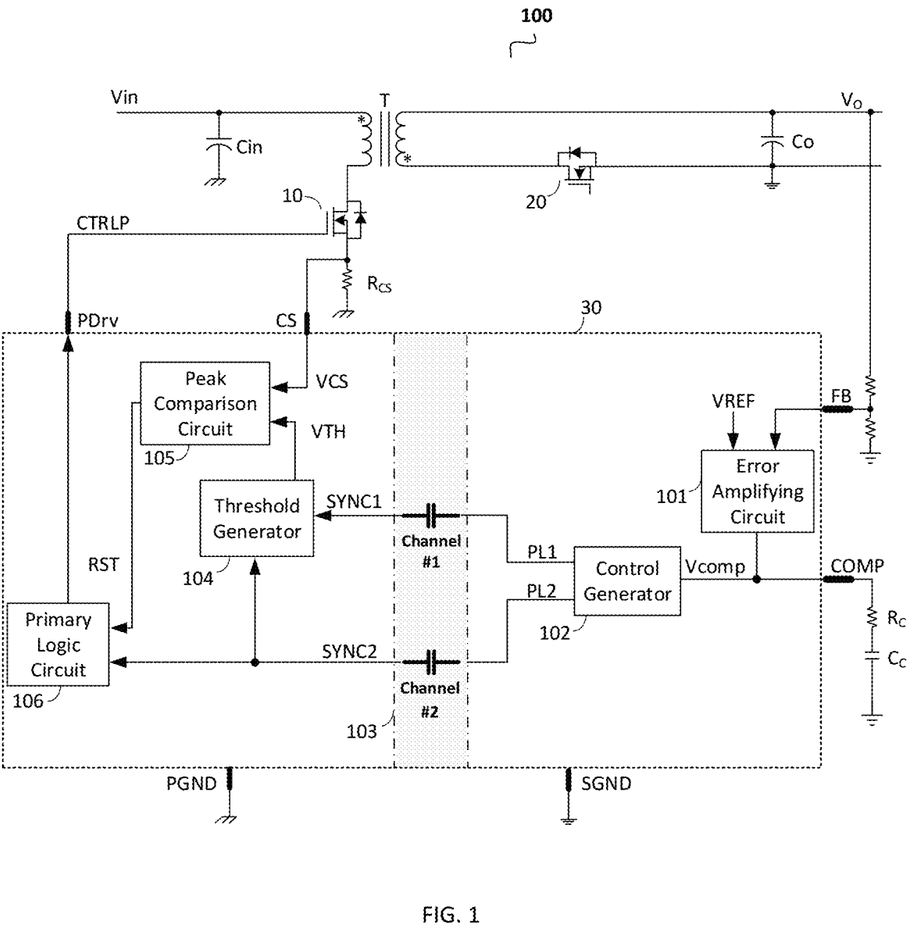
FIG. 1 shows a block diagram of an isolated switching converter 100 in accordance with an embodiment of the present invention.

FIG. 1 shows a block diagram of an isolated switching converter 100 in accordance with an embodiment of the present invention. As shown in FIG. 1, the isolated switching converter 100 comprises a transformer T, a primary switch 10, a secondary switch 20 and a controller 30. The transformer T providing isolation between a primary side and a secondary side that has a primary winding, a secondary winding. The primary winding and the secondary winding both have a first terminal and a second terminal. The first terminal of the primary winding receives an input voltage Vin, the first terminal of the secondary winding provides a DC output voltage Vo, and the second terminal of the secondary winding is coupled to a secondary reference ground. The primary switch 10 is coupled between the second terminal of the primary winding and a primary reference ground. The secondary switch 20 is coupled between the second terminal of the secondary winding and a load. However, those skilled in the art should know that the secondary switch 20 may also be coupled between the first terminal of the secondary winding and the load.

In the embodiment shown in FIG. 1, the controller 30 of the switching converter 100 introduces quasi-resonant control. The switching converter 100 with quasi-resonant control works under CRM (critical-current-mode), which means once a current flowing through an energy storage component (e.g., the transformer T) reaches zero, the energy storage component begin to resonate with the parasitic capacitance of the primary switch 10, and thus a resonant voltage is generated. The primary switch 10 is turned on when a voltage across the primary switch 10 reaches its resonant valley (valley point of the voltage during resonance) which is called valley switching, so as to reduce the switching loss and EMI.

The controller 30 comprises an error amplifying circuit 101, a control generator 102, an isolation circuit 103, a threshold generator 104, a peak comparison circuit 105 and a primary logic circuit 106. In one embodiment, the controller 30 and the secondary switch 20 are integrated into a monolithic chip and provides a driver circuit for the secondary switch 20.

In the example shown in FIG. 1, the controller 30 comprises a plurality of pins including an output feedback pin FB, a compensation pin COMP, a secondary reference ground pin SGND, a primary reference ground pin PGND, a primary current sense pin CS and a primary control pin PDrv.

The error amplifying circuit 101 has a first input terminal, a second input terminal and an output terminal, wherein the first input terminal is coupled to the output feedback pin FB to receive an output feedback signal VFB indicative of an output signal (e.g., the output voltage Vo) of the switching converter 100, the second input terminal is configured to receive a reference voltage VREF, and the output terminal is coupled to the compensation pin COMP. The error amplifying circuit 101 generates a first compensation signal Vcomp based on the difference between the output feedback signal VFB and the reference voltage VREF.

The control generator 102 is coupled to the compensation pin COMP to receive the first compensation signal Vcomp, and respectively provides a first control signal PL1 and a second control signal PL2 for controlling a first threshold voltage VTH and a switching frequency of the primary switch 10. The isolation circuit 103 has a first channel to transmit the first control signal PL1 and a second channel to transmit the second control signal PL2, and further has a first output terminal for providing a first synchronous signal SYNC1 electrically isolated from the first control signal PL1 and a second output terminal for providing a second synchronous signal SYNC2 electrically isolated from the second control signal PL2.

As shown in FIG. 1, the threshold generator 104 is coupled to the first output terminal of the isolation circuit 103 to receive the first synchronous signal SYNC1, and provides the first threshold voltage VTH based on the first synchronous signal SYNC1. The peak comparison circuit 105 has a first input terminal, a second input terminal and an output terminal, wherein the first input terminal is coupled to the primary current sense pin CS to receive a current sense signal VCS indicative of the current flowing through the primary switch 10. The second input terminal of the peak comparison circuit 105 is coupled to the output terminal of the threshold generator 104 to receive the first threshold voltage VTH. The peak comparison circuit 105 compares the current sense signal VCS with the first threshold voltage VTH, and provides a turning-off control signal RST. Baes on the second synchronous signal SYNC2 and the turning-off control signal RST, the primary logic circuit 106 provides a primary control signal CTRLP at an output terminal to a control terminal of the primary switch 10 through the primary control pin PDrv, for controlling the primary switch 10.

In the example shown in FIG. 1, the isolation circuit 103 with two isolated channels provides communication between the secondary side and the primary side, and thus the first synchronous signal SYNC1 electrically isolated from the first control signal PL1 is transmitted to the primary side through the first channel, and the second synchronous signal SYNC2 electrically from the second control signal PL2 is also transmitted to the primary side through the second channel. The first synchronous signal SYNC1 is configured to control the first threshold voltage VTH of the primary switch 10, and the second synchronous signal SYNC2 is configured to control the switching frequency of the primary switch 10.

Figure 2:
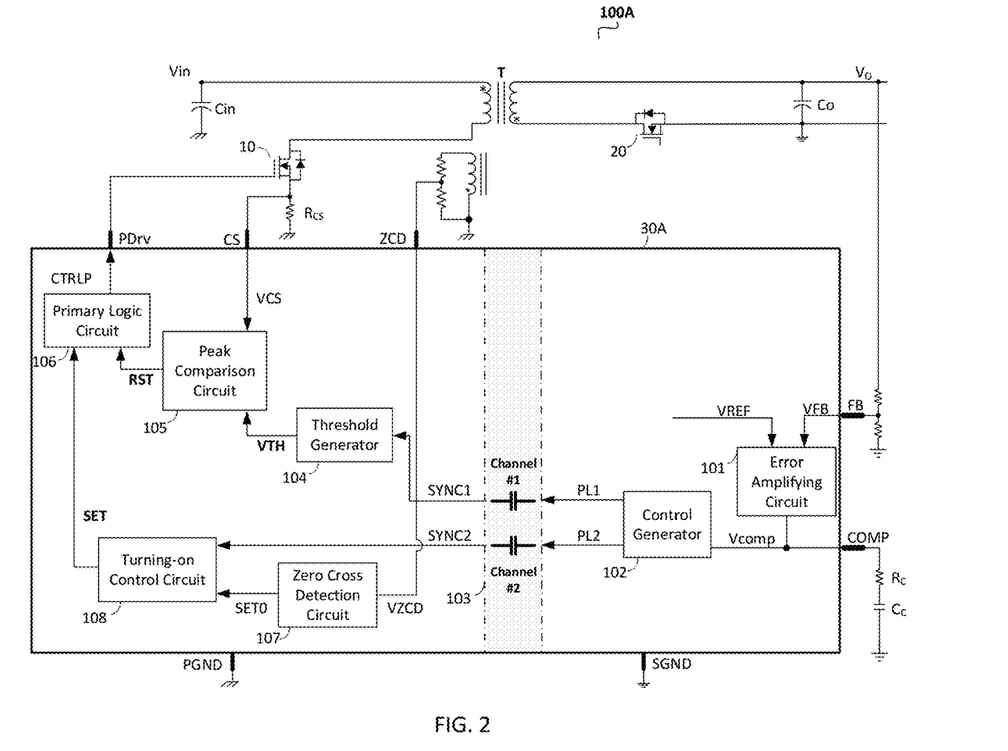
FIG. 2 shows a flow diagram of a control method 200 for the isolated switching converter 100 in accordance with an embodiment of the present invention.

FIG. 2 shows a schematic diagram of an isolated switching converter 100A in accordance with an embodiment of the present invention. Compared with the switching converter 100 shown in FIG. 1, the switching converter 100A shown in FIG. 2 further comprises a zero cross detection circuit 107 and a turning-on control circuit 108.

The zero cross detection circuit 107 is configured to detect if a voltage $V_{Pri\_DS}$ across the primary switch 10 reached its minimum value, i.e., the valleys. In the example shown in FIG. 2, the isolated switching converter 100A further comprises an auxiliary winding of the transformer T. The auxiliary winding is coupled to a zero-crossing detection pin ZCD through a voltage divider. The zero cross detection circuit 107 is coupled to the zero-crossing detection pin ZCD to receive a zero cross detection signal VZCD, and compares the zero cross detection signal VZCD with a zero-crossing threshold voltage VZCD_TH, and provides a zero-crossing signal SETO at an output terminal.

The turning-on control circuit 108 provides a turning-on control signal SET at an output terminal for controlling the switching frequency of the primary switch 10 based on the second synchronous signal SYNC2 and the zero-crossing signal SETO. In the example shown in FIG. 2, the turning-on control circuit 108 has a first input terminal, a second input terminal and an output terminal, wherein the first input terminal is coupled to the second output terminal of the isolation circuit 103 to receive the second synchronous signal SYNC2, the second input terminal is coupled to the zero cross detection circuit 107 to receive the zero-crossing signal SETO, the turning-on control circuit 108 provides the turning-on control signal SET based on the second synchronous signal SYNC2 and the zero-crossing signal SETO, to control the turning-on of the primary switch 10. In one embodiment, when the second synchronous signal SYNC2 comes and the voltage across the primary switch 10 reaches its valley, the primary switch 10 is turned on.

Figure 3:
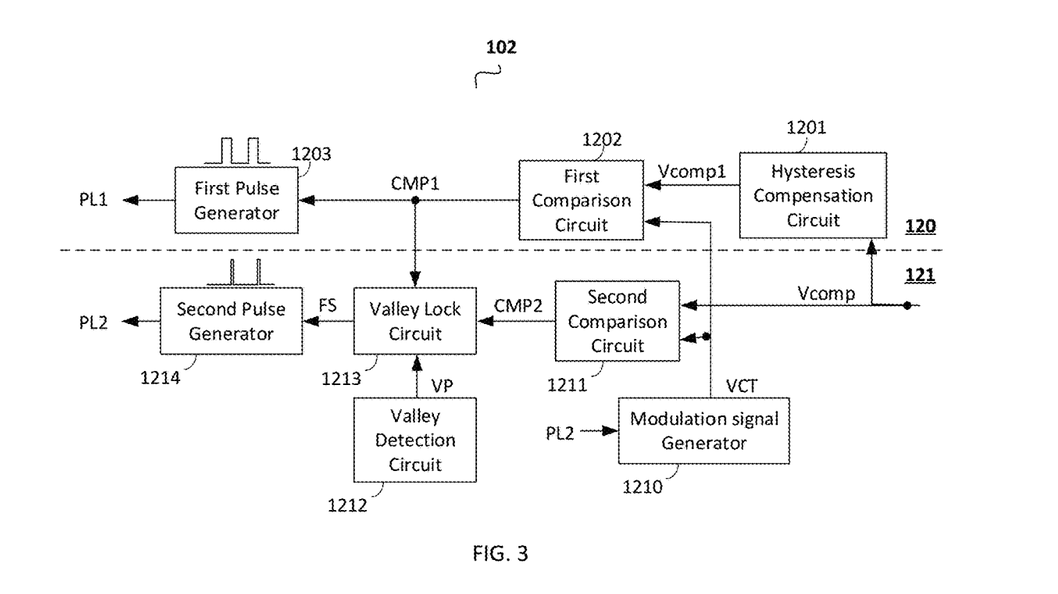
FIG. 3 shows a schematic diagram of a control principle for a second ON-time of the secondary switch in accordance with an embodiment of the present invention.

FIG. 3 shows a schematic diagram of a control generator 102 in accordance with an embodiment of the present invention. In the example shown in FIG. 3, the control generator 102 comprises a first control signal generator 120 and a second control signal generator 121.

As shown in FIG. 3, the first control signal generator comprises a hysteresis compensation circuit 1201, a first comparison circuit 1202 and a first pulse generator 1203. The hysteresis compensation circuit 1201 is coupled to the output terminal of the error amplifying circuit 101 to receive the first compensation signal Vcomp, and provides a second compensation signal Vcomp1 at an output terminal. In one embodiment, the hysteresis compensation circuit 1201 adds a hysteresis signal onto the first compensation signal Vcomp, to generate the second compensation signal Vcomp1. In another embodiment, the second compensation signal Vcomp1 is proportional to the first compensation signal Vcomp, and the proportional coefficient is K1.

The first comparison circuit 1202 is coupled to the output terminal of the hysteresis compensation circuit 1201 to receive the second compensation signal Vcomp1, and is also coupled to an output terminal of a modulation generator 1210 to receive a modulation signal VCT. The first comparison circuit 1202 compares the second compensation signal Vcomp1 and the modulation signal VCT, and provides a first comparison signal CMP1 at an output terminal. The first pulse generator 1203 is configured to receive the first comparison signal CMP1, and provides a first control signal PL1 in the form of pulses at an output terminal, for transmitting to the primary side through the first channel of the isolation circuit 103.

In the example shown in FIG. 3, the second control signal generator 121 comprises a second comparison circuit 1211, a valley detection circuit 1212, a valley lock circuit 1213 and a second pulse generator 1214. The second comparison circuit 1211 is coupled to the output terminal of the error amplifying circuit 101 to receive the first compensation signal Vcomp, and is further coupled to the modulation generator 1210 to receive the modulation signal VCT. The second comparison circuit 1211 compares the modulation signal VCT with the first compensation signal Vcomp, and provides a second comparison signal CMP2 at an output terminal. The valley detection circuit 1212 is configured to detect one or more valleys of a voltage drop across the secondary switch 20 during the OFF state of the secondary switch 20 and to generate a valley pulse signal VP at an output terminal. The valley lock circuit 1213 is configured to receive the first comparison signal CMP1, the second comparison signal CMP2, and the valley pulse signal VP. Based on the first comparison signal CMP1, the second comparison signal CMP2, the valley pulse signal VP and a current locked valley number V_LOCK(n−1), the valley lock circuit 1213 determines a target locked valley number V_LOCK(n) for next turning-on, and further provides a frequency control signal FS corresponding to the target valley number V_LOCK(n) at an output terminal, for controlling the switching frequency of the primary switch 10.

In one embodiment, the valley lock circuit 1213 is configured compare a first designated valley number when the modulation signal VCT reaches the second compensation signal Vcomp1 with the current locked valley number V_LOCK(n−1), to determine whether to increase the target locked valley number V_LOCK(n). The valley lock circuit 1213 is configured compare a second designated valley number when the modulation signal VCT reaches the first compensation signal Vcomp with the current locked valley number V_LOCK(n−1), to determine whether to decrease the target locked valley number V_LOCK(n).

The second pulse generator 1214 is configured to receive the frequency control signal FS, and provides the second control signal PL2 in the form of pulses at an output terminal, for transmitting to the primary side through the second channel of the isolation circuit 103.

Figure 4:
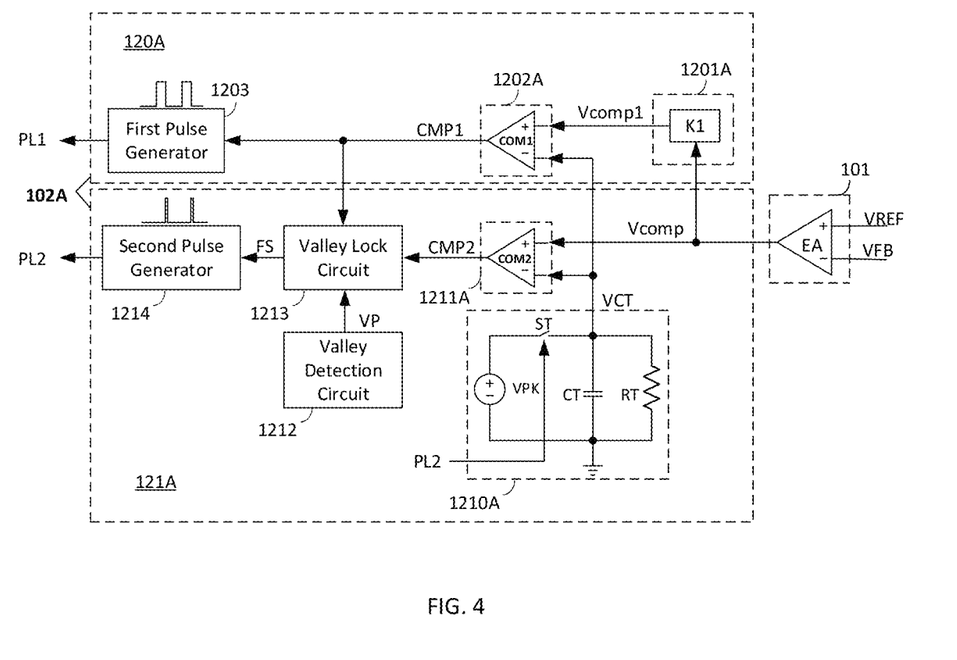
FIG. 4 shows a schematic diagram of a controller 30 for an isolated switching converter in accordance with an embodiment of the present invention.

FIG. 4 shows a schematic diagram of an error amplifying circuit 101 and a control generator 102A in accordance with an embodiment of the present invention. In the example shown in FIG. 4, the error amplifying circuit 101 comprises an error amplifier EA. The non-inverting input terminal of the error amplifier EA is configured to receive the output feedback signal VFB indicative of the output voltage Vo of the switching converter, the inverting input terminal is configured to receive the reference voltage VREF, the output terminal is configured to provide the first compensation signal Vcomp.

As shown in FIG. 4, the control signal generator 102A comprises a first control signal generator 120A and a second control signal generator 121A. The first control signal generator 120A comprises a hysteresis compensation circuit 1201A, a first comparison circuit 1202A and the first pulse generator 1203. The hysteresis compensation circuit 1201A comprises a proportional circuit. The proportional circuit is configured to receive the first compensation signal Vcomp and provides the second compensation signal Vcomp1 at an output terminal. In one embodiment, Vcomp1=K1*Vcomp, where K1 is a proportional coefficient greater than 1.

The second control signal generator 121A comprises a modulation generator 1210A, a second comparison circuit 1211A, the valley detection circuit 1212, the valley lock circuit 1213, and the second pulse generator 1214.

As shown in FIG. 4, the modulation generator 1210A comprises a voltage source VPK, a switch ST, a capacitor CT and a resistor RT. As shown in FIG. 4, the voltage source VPK has a positive terminal and a negative terminal, wherein the negative terminal is coupled to the secondary reference ground. The switch ST has a first terminal, a second terminal and a control terminal, wherein the first terminal is coupled to the positive terminal of the voltage source VPK, the control terminal is to receive the second control signal PL2. The capacitor CT has a first terminal and a second terminal, wherein the first terminal is coupled to the second terminal of the switch ST, the second terminal is coupled to the secondary reference ground. The resistor RT has a first terminal and a second terminal, wherein the first terminal is coupled to the first terminal of the capacitor CT, the second terminal is coupled to the secondary reference ground. The modulation signal VCT is generated at the first terminal of the capacitor CT. When the second control signal PL2 is asserted, the modulation signal VCT is pulled up to a peak voltage, then begins to decrease until the second control signal PL2 is asserted again.

The first comparison circuit 1202A comprises a comparator COM1. The non-inverting input terminal of the comparator COM1 is coupled to receive the second compensation signal Vcomp1, the inverting input terminal of the comparator COM1 is coupled to the first terminal of the capacitor CT to receive the modulation signal VCT. The first comparison circuit 1202A provides a first comparison signal CMP1. The second comparison circuit 1211A comprises a comparator COM2. The non-inverting input terminal of the comparator COM2 is coupled to receive the first compensation signal Vcomp, the inverting input terminal of the comparator COM2 is coupled to the first terminal of the capacitor CT to receive the modulation signal VCT. The second comparison circuit 1211A provides the second comparison signal CMP2 at the output terminal.

Figure 5:
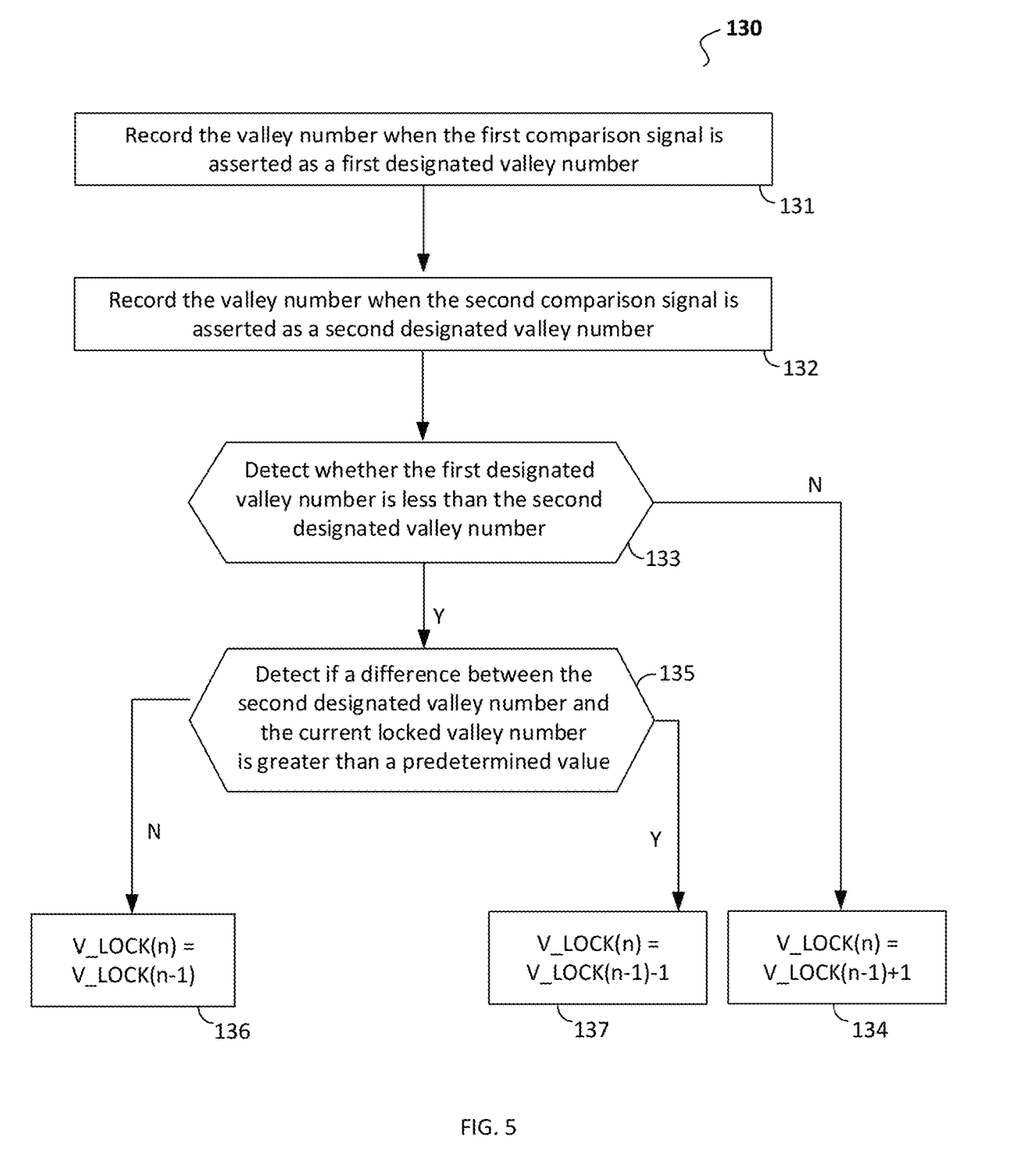
FIG. 5 shows a working waveform diagram of the isolated switching converter in accordance with an embodiment of the present invention.

FIG. 5 shows a flow diagram of a method 130 for determining the target valley number in accordance with an embodiment of the present invention. As shown in FIG. 5, the method 130 comprises steps 131~137.

At step 131, a valley number when the first comparison signal CMP1 is asserted is recorded as a first designated valley number.

At step 132, a valley number when the second comparison signal CMP2 is asserted is recorded as a second designated valley number.

At step 133, determining if the first designated valley number is less than the current locked valley number. If the determination is yes, go the step 135. Otherwise, go the step 134, the target locked valley number will be increased.

At step 135, determining if the difference between the second designated valley number and the current locked valley number is greater than a preset value. If the determination is yes, go step 137, the target locked valley number will be decreased. Otherwise, go step 136, the target locked valley number will be kept unchanged.

Figure 6:
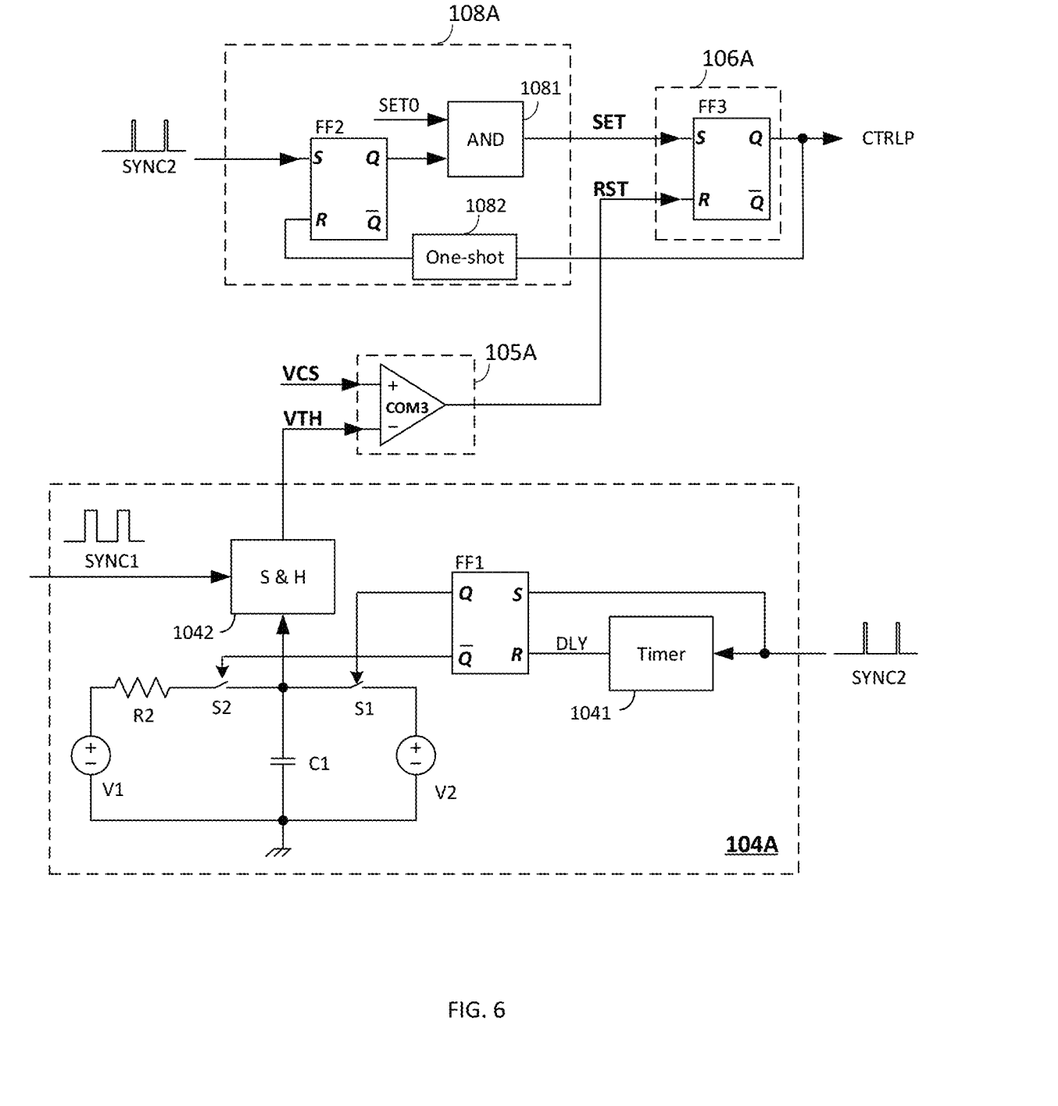
FIG. 6 shows a schematic diagram of a timer 303A and a threshold generator 304A in accordance with an embodiment of the present invention.

FIG. 6 shows a schematic diagram of part of the controller 30 located at the primary side in accordance with an embodiment of the present invention. As shown in FIG. 6, the part of the controller 30 located at the primary side comprises a threshold generator 104A, a peak comparison circuit 105A, a turning-on control circuit 108A and a primary logic circuit 106A.

In the example shown in FIG. 6, the threshold generator 104A comprises a first capacitor C1. When a rising edge of the second synchronous signal SYNC2 comes, the voltage across the first capacitor C1 is set high to an upper threshold voltage Vs2, and then the voltage across the capacitor C1 begins to drop, and when the first synchronous signal SYNC1 comes, the voltage across the first capacitor C1 is sampled and held to provide a first threshold voltage VTH.

As shown in FIG. 6, the threshold generator 104A further comprises a timer circuit 1041, a flip-flop FF1, voltage sources V1 and V2, switches S1 and S2, a resistor R2 and a sample-and-hold circuit 1042. The timer circuit 1041 has an input terminal and an output terminal, wherein the input terminal is coupled to the second output terminal of the isolation circuit 103 to receive the second synchronous signal SYNC2, the timer circuit 1041 performs timing based on the second synchronous signal SYNC2, and generates a timing signal DLY at an output terminal. The flip-flop FF1 has a set terminal, a reset terminal and an output terminal, wherein the set terminal receives the second synchronous signal SYNC2, and the reset terminal is coupled to the output terminal of the timer circuit 1041 to receive timing signal DLY. The voltage source V1 is configured to provide a lower threshold voltage Vs1, and has a positive terminal and a negative terminal, wherein the negative terminal is coupled to a primary reference ground. The voltage source V2 is configured to provide the upper threshold voltage Vs2, and has a positive terminal and a negative terminal, wherein the negative terminal is coupled to the primary reference ground. The switch S1 has a first terminal, a second terminal and a control terminal, wherein the first terminal is coupled to the first terminal of the first capacitor C1, the second terminal is coupled to the positive terminal of the voltage source V2, and the control terminal is coupled to the output terminal of the flip-flop FF1. The switch S2 has a first terminal, a second terminal and a control terminal, wherein the first terminal is coupled to the first terminal of the first capacitor C1, and the second terminal is coupled to the positive terminal of the voltage source V1 through the resistor R2, the control terminal id coupled to the inverting output terminal of the flip-flop FF1. The sample-and-hold circuit 1042 has a first input terminal, a second input terminal and an output terminal, wherein the first input terminal is coupled to the first output terminal of the isolation circuit 103 to receive the first synchronous signal SYNC1, the second input terminal is coupled to the first terminal of the first capacitor C1 to receive the voltage across the first capacitor C1, the sample-and-hold circuit 1042 provides the first threshold voltage VTH at the output terminal by sampling and holding the voltage across the first capacitor C1 based on the first synchronous signal SYNC1.

The peak comparison circuit 105A comprises a comparator COM3. The non-inverting input terminal of the comparator COM3 is coupled to receive the current sense signal VCS, the inverting input terminal of the comparator COM3 is coupled to receive the first threshold voltage VTH. The comparator COM3 provides the turning-off control signal RST at the output terminal.

The turning-on control circuit 108A comprises a flip-clop FF2, a AND gate circuit 1081 and a one-shot circuit 1082. The flip-flop FF2 has a set terminal, a reset terminal and an output terminal, wherein the set terminal is coupled to receive the second synchronous signal SYNC2, the reset terminal is coupled to an output terminal of the primary logic circuit 106A through the one-shot circuit 1082, to receive the primary control signal CTRLP. The AND gate circuit 1081 has a first input terminal, a second input terminal and an output terminal, wherein the first input terminal is coupled to the output terminal of the flip-flop FF2, the second input terminal is coupled to an output terminal of the zero cross detection circuit 107 to receive the zero-crossing signal SETO. The AND gate circuit 1081 provides the turning-on control signal SET. The primary logic circuit 106A comprises a flip-flop FF3. The flip-flop FF3 has a set terminal, a reset terminal, and an output terminal, wherein the reset terminal is coupled to the output terminal of the primary control circuit 108A to receive the turning-on control signal SET, and the reset terminal is coupled to the output terminal of the peak comparison circuit 105A to receive the turning-off control signal RST, and the flip-flop FF3 provides the primary control signal CTRLP at the output terminal.

Figure 7:
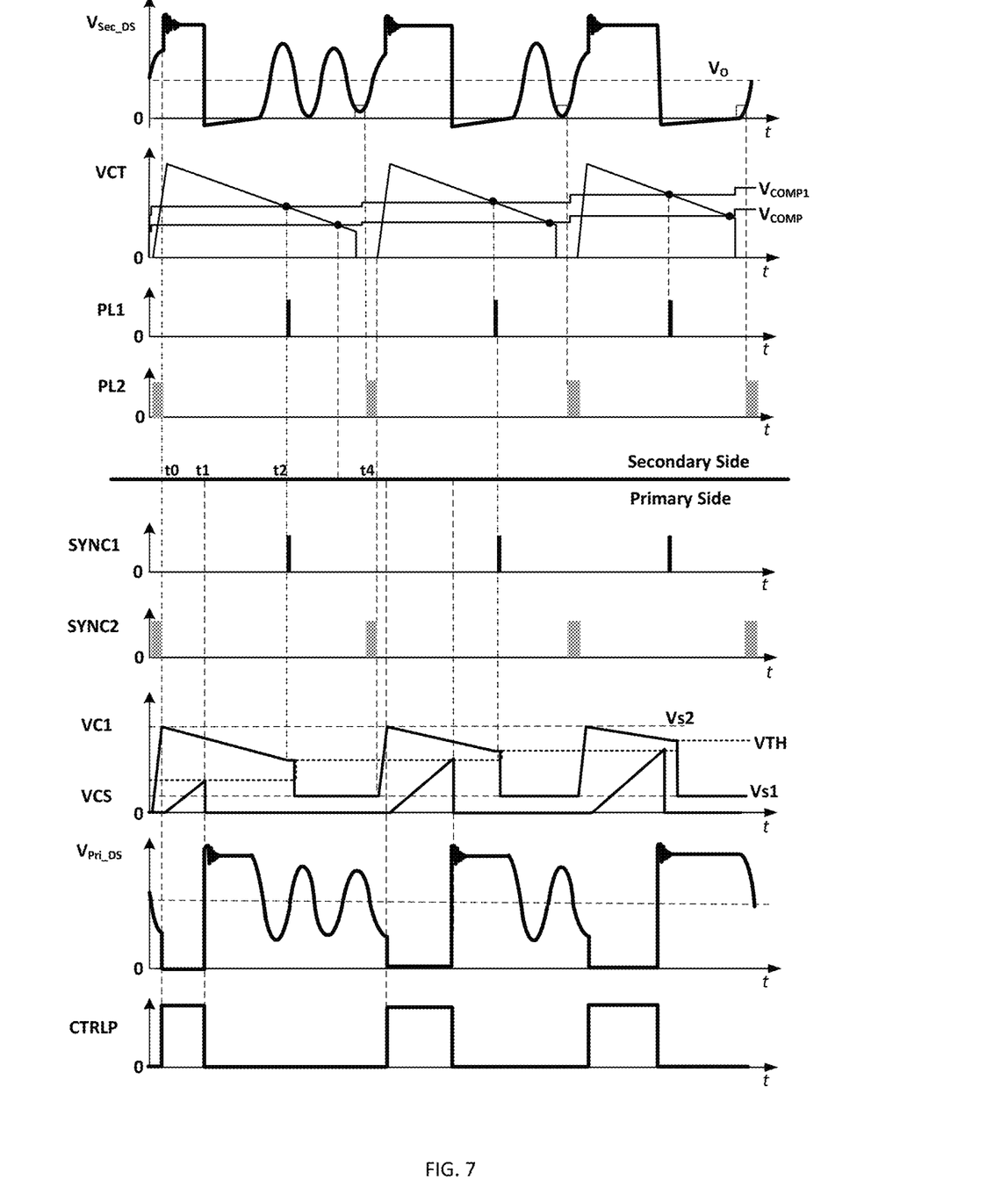
FIG. 7 shows a schematic diagram of an ON-time control circuit 305A in accordance with an embodiment of the present invention.

FIG. 7 shows a working waveform diagram of the isolated switching converter in accordance with an embodiment of the present invention. As shown in FIG. 7, at time t0, the second synchronous signal SYNC2 comes, the voltage VC1 across the first capacitor C1 is set high to the upper threshold voltage Vs2. Subsequently, the voltage VC1 begin to drop. At the same time, the second synchronous signal SYNC2 comes and the voltage $V_{Pri\_DS}$ across the primary switch 10 reaches its minimum value, and thus the primary switch 20 is turned on.

The current flowing through the primary switch 10 continues to increase. At time t1, the primary switch 10 is turned off when the current sense signal VCS increases to reach the first threshold voltage VTH.

At time t2, the first synchronous signal SYNC1 comes, the voltage VC1 across the first capacitor C1 is sampled and held, to generate the first threshold voltage VTH. Then the voltage VC1 is reset and is pulled down to the lower threshold voltage Vs1. At time t4, the second synchronous signal SYNC2 comes and the voltage $V_{Pri\_DS}$ reaches its minimum value, the primary switch 20 is turned on again.

The process mentioned above is repeated continuously, as shown in FIG. 7, as the load increases, the frequency of the first synchronous signal SYNC1 becomes higher, and the first threshold voltage VTH also becomes higher accordingly.

Figure 8:
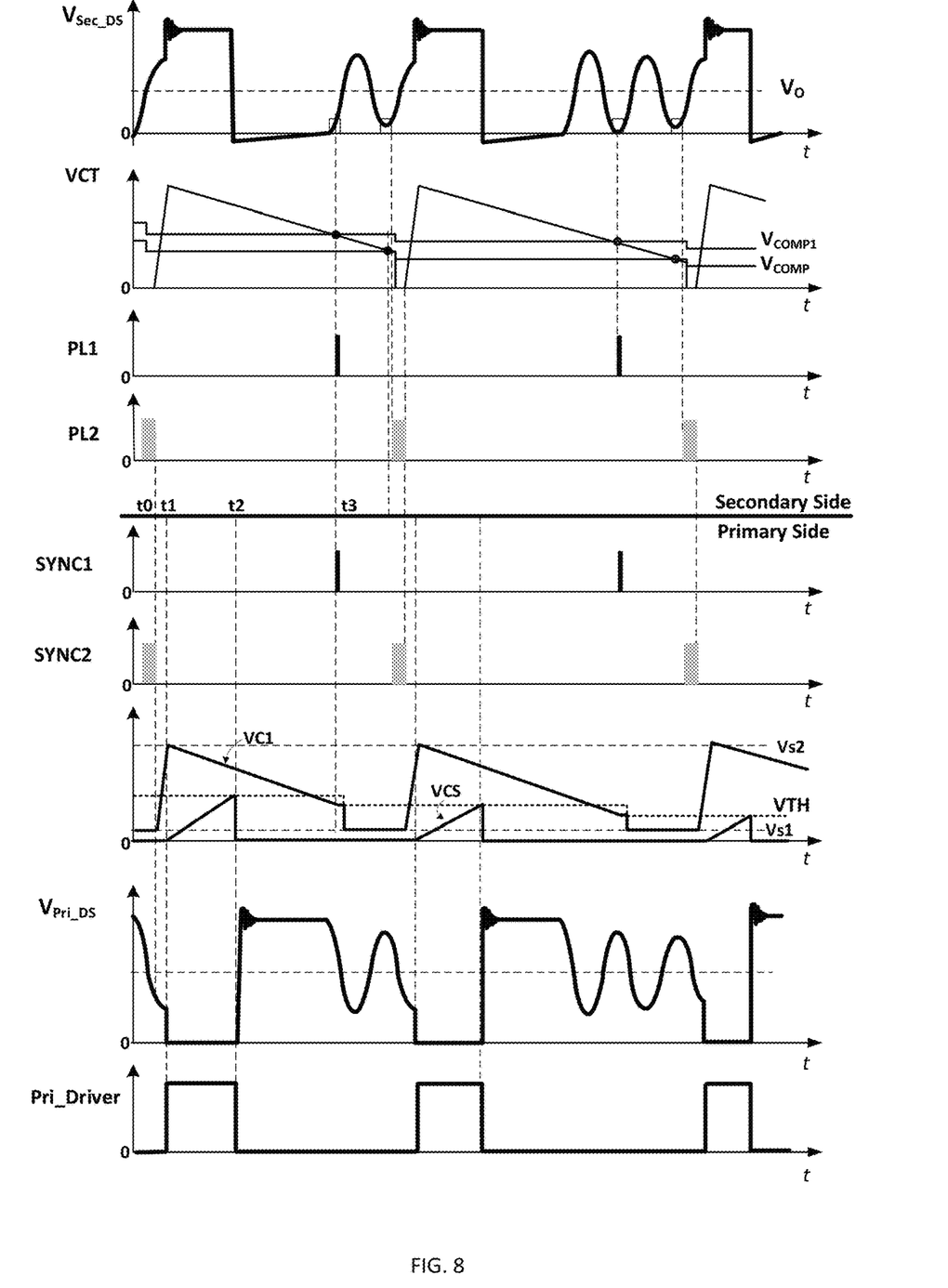
FIG. 8 shows a flow diagram of a method 204 for generating an ON-time control signal ZOFF in accordance with an embodiment of the present invention.

FIG. 8 shows a working waveform diagram of the isolated switching converter in accordance with another embodiment of the present invention. In the example shown in FIG. 8, at time to, the second synchronous signal SYNC2 comes, the voltage VC1 is pulled high to the upper threshold voltage Vs2. And then the voltage VC1 starts to drop. At time t1, since the second synchronous signal SYNC2 comes and the voltage $V_{Pri\_DS}$ reaches its minimum value, the primary switch 10 is turned on.

At time t2, the current sense signal VCS increases to reach the first threshold voltage VTH, the primary switch 10 is turned off.

At time t3, the first synchronous signal SYNC1 comes, the voltage VC1 is sampled and held, to provide the first threshold voltage VTH. The process mentioned above is repeated continuously, as shown in FIG. 8, as the load decreases, the first threshold voltage VTH also becomes lower accordingly.

Figure 9:
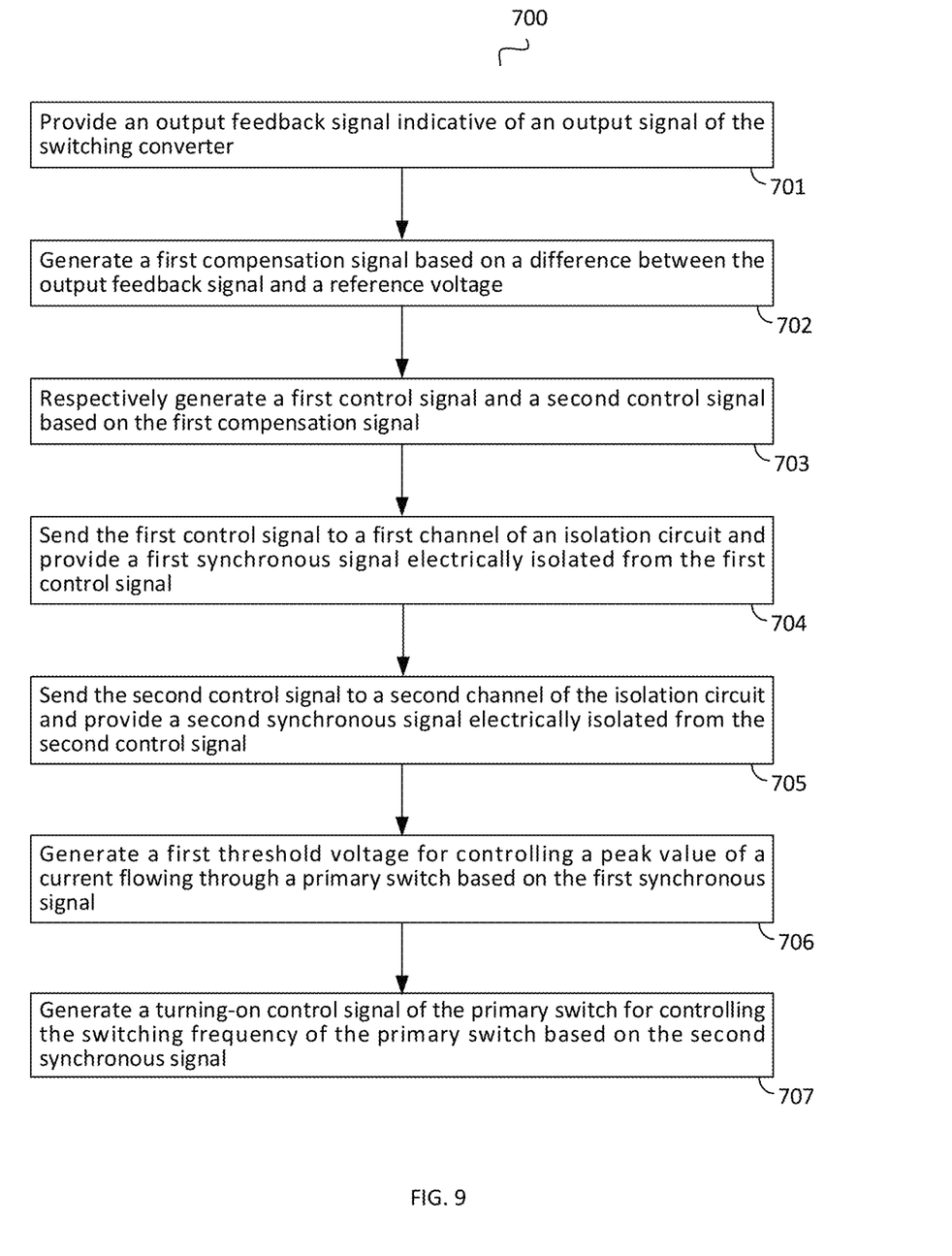
FIG. 9 shows a flow diagram of a control method 700 used in an isolated switching converter in accordance with an embodiment of the present invention.

FIG. 9 shows a flow diagram of a control method 700 used in an isolated switching converter in accordance with an embodiment of the present invention. The isolated switching converter has a transformer having a primary winding and a secondary winding, a primary switch coupled to the primary winding, a secondary switch coupled to the secondary winding and an isolation circuit, the control method comprises steps 701~707.

At step 701, an output feedback signal indicative of an output signal of the isolated switching converter is provided.

At step 702, based on the difference between a reference voltage and the output feedback signal, a first compensation signal is provided.

At step 703, based on the first compensation signal, a first control signal and a second control signal are generated respectively.

In one embodiment, the method of generating the first control signal comprises: generating a second compensation signal based on the first compensation signal; comparing the second compensation signal with a modulation signal and providing a first comparison signal; and providing the first control signal based on the first comparison signal.

In a further embodiment, the method of generating the second control signal comprises: comparing the first compensation signal with the modulation signal and providing a second comparison signal; based on a valley pulse signal corresponding to one or more valleys of a voltage drop across the secondary switch, the first comparison signal and the second comparison signal, a target locked valley number is determined; and a second control signal corresponding to the target locked valley number is determined for turning ON the primary switch.

At step 704, the first control signal is transmitted to a first channel of the isolation circuit, and a first synchronous signal electrically isolated from the first control signal is provided.

At step 705, the second control signal is transmitted to a second channel of the isolation circuit, a second synchronous signal electrically isolated from the second control signal is provided.

At step 706, based on the first synchronous signal, a first threshold voltage is provided to control a peak voltage of the current flowing through the primary switch. In one embodiment, when the rising edge of the second synchronous signal comes, the voltage across the first capacitor is set high to an upper threshold voltage. Them the voltage across the first capacitor begins to drop. When the first synchronous signal comes, the voltage across the first capacitor is sampled and held to provide the first threshold voltage.

At step 707, based on the second synchronous signal, a turning-on control signal is provided to control the switching frequency of the primary switch 10. In one embodiment, the step 707 further comprises: when the second synchronous signal comes and the voltage across the primary switch reaches its resonant valley, the primary switch is turned on.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Obviously, many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A controller used in an isolated switching converter, wherein the isolated switching converter has a transformer having a primary winding and a secondary winding, a primary switch coupled to the primary winding and a secondary switch coupled to the secondary winding, the controller comprising:
    an error amplifying circuit configured to generate a first compensation signal based on the difference between a reference voltage and an output feedback signal indicative of an output signal of the isolated switching converter;
    a control generator configured to respectively generate a first control signal and a second control signal based on the first compensation signal;
    an isolation circuit having a first channel to transmit the first control signal and a second channel to transmit the second control signal, and having a first output terminal for providing a first synchronous signal electrically isolated from the first control signal and a second output terminal for providing a second synchronous signal electrically isolated from the second control signal;
    a threshold generator coupled to the first output terminal of the isolation circuit to receive the first synchronous signal and generate a first threshold voltage based on the first synchronous signal;
    a peak comparison circuit configured to generate a turning-off control signal by comparing a current sense signal indicative of a current flowing through the primary switch with the first threshold voltage; and
    a primary logic circuit configured to provide a primary control signal for controlling the primary switch based on the second synchronous signal and the turning-off control signal.

2. The controller of claim 1, wherein the control generator comprises a first control signal generator and a second control signal generator, wherein:
    the first control signal generator comprising:
        a hysteresis compensation circuit configured to generate a second compensation signal based on the first compensation signal;
        a first comparison circuit configured to generate a first comparison signal by comparing the second compensation signal and a modulation signal; and
        a first pulse generator configured to provide the first control signal based on the first comparison signal; and
    the second control signal generator comprising:
        a second comparison circuit configured to generate a second comparison signal by comparing the first compensation signal and the modulation signal;
        a valley lock circuit configured to determine a target locked valley number based on a valley pulse signal corresponding to one or more valleys of a voltage drop across the secondary switch, the first comparison signal and the second comparison signal, and to generate a frequency control signal corresponding to the target locked valley number; and
        a second pulse generator configured to provide the second control signal based on the frequency control signal.

3. The controller of claim 2, wherein the modulation signal is increased up to a peak voltage when the second control signal is asserted and then begins to drop until the second control signal is asserted again.

4. The controller of claim 2, wherein the valley lock circuit is further configured to determine whether to increase the target locked valley number by comparing a first designated valley number when the modulation signal increases to reach the second compensation signal with a current locked valley number, and to determine whether to decrease the target locked valley number by comparing a second designated valley number when the modulation signal increases to reach the first compensation signal with the current locked valley number.

5. The controller of claim 1, wherein the threshold generator comprises a first capacitor, wherein when a rising edge of the second synchronous signal comes, a voltage across the first capacitor is set high to be an upper threshold voltage, and the voltage across the first capacitor begins to drop, and when a rising edge of the first synchronous signal comes, the voltage across the first capacitor is sampled and held for providing the first threshold voltage.

6. The controller of claim 5, wherein the threshold generator comprising:
    a timer circuit having an input terminal and an output terminal, wherein the input terminal is coupled to the second output terminal of the isolation circuit to receive the second synchronous signal, and based on the second synchronous signal, the timer circuit provides a timing signal at the output terminal;
    a flip-flop having a first input terminal, a second input terminal, an output terminal and an inverting output terminal, wherein the first input terminal is configured to receive the second synchronous signal, the second input terminal is coupled to the output terminal of the timer circuit to receive the timing signal;
    the first capacitor having a first terminal and a second terminal coupled to a primary reference ground;

a first voltage source having a positive terminal and a negative terminal coupled to the primary reference ground;

a second voltage source having a positive terminal and a negative terminal coupled to the primary reference ground;

a first switch having a first terminal, a second terminal and a control terminal, wherein the first terminal is coupled to the first terminal of the first capacitor, and a second terminal is coupled to the positive terminal of the first voltage source, and the control terminal is coupled to the output terminal of the flip-flop;

a second switch having a first terminal, a second terminal and a control terminal, wherein the first terminal is coupled to the first terminal of the first capacitor, a second terminal is coupled to the positive terminal of the second voltage source through a first resistor, and the control terminal is coupled to the inverting output terminal of the flip-flop; and a sample-and-hold circuit configured to provide the first threshold voltage by sampling and holding the voltage across the first capacitor based on the first synchronous signal.

7. The controller of claim 1, wherein the primary logic circuit is configured to turn on the primary switch when the second synchronous signal comes and a voltage across the primary switch reaches its resonant valley.

8. An isolated switching converter, comprising:
a primary switch coupled to a primary winding of a transformer;
a secondary switch coupled to a secondary winding of the transformer;
a controller, comprising:
an error amplifying circuit configured to generate a first compensation signal based on the difference between a reference voltage and an output feedback signal indicative of an output signal of the isolated switching converter;
a control generator configured to respectively generate a first control signal and a second control signal based on the first compensation signal;
an isolation circuit having a first channel to transmit the first control signal and a second channel to transmit the second control signal, and having a first output terminal for providing a first synchronous signal electrically isolated from the first control signal and a second output terminal for providing a second synchronous signal electrically isolated from the second control signal;
a threshold generator coupled to the first output terminal of the isolation circuit to receive the first synchronous signal and generate a first threshold voltage based on the first synchronous signal;
a peak comparison circuit configured to generate a turning-off control signal by comparing a current sense signal indicative of a current flowing through the primary switch with the first threshold voltage; and
a primary logic circuit configured to provide a primary control signal for controlling the primary switch based on the second synchronous signal and the turning-off control signal.

9. The isolated switching converter of claim 8, wherein the control generator comprises a first control signal generator and a second control signal generator, wherein:
the first control signal generator comprising:

a hysteresis compensation circuit configured to generate a second compensation signal based on the first compensation signal;
a first comparison circuit configured to generate a first comparison signal by comparing the second compensation signal and a modulation signal; and
a first pulse generator configured to provide the first control signal based on the first comparison signal; and
the second control signal generator comprising:
a second comparison circuit configured to generate a second comparison signal by comparing the first compensation signal and the modulation signal;
a valley lock circuit configured to determine a target locked valley number based on a valley pulse signal corresponding to one or more valleys of a voltage drop across the secondary switch, the first comparison signal and the second comparison signal, and to generate a frequency control signal corresponding to the target locked valley number; and
a second pulse generator configured to provide the second control signal based on the frequency control signal.

10. The isolated switching converter of claim 9, wherein the modulation signal is increased up to a peak voltage when the second control signal is asserted and then begins to drop until the second control signal is asserted again.

11. The isolated switching converter of claim 9, wherein the valley lock circuit is further configured to determine whether to increase the target locked valley number by comparing a first designated valley number when the modulation signal increases to reach the second compensation signal with a current locked valley number, and to determine whether to decrease the target locked valley number by comparing a second designated valley number when the modulation signal increases to reach the first compensation signal with the current locked valley number.

12. The isolated switching converter of claim 8, wherein the threshold generator comprises a first capacitor, wherein when a rising edge of the second synchronous signal comes, a voltage across the first capacitor is set high to be an upper threshold voltage, and the voltage across the first capacitor begins to drop, and when a rising edge of the first synchronous signal comes, the voltage across the first capacitor is sampled and held for providing the first threshold voltage.

13. The isolated switching converter of claim 12, wherein the threshold generator comprising:
a timer circuit having an input terminal and an output terminal, wherein the input terminal is coupled to the second output terminal of the isolation circuit to receive the second synchronous signal, and based on the second synchronous signal, the timer circuit provides a timing signal at the output terminal;
a flip-flop having a first input terminal, a second input terminal, an output terminal and an inverting output terminal, wherein the first input terminal is configured to receive the second synchronous signal, the second input terminal is coupled to the output terminal of the timer circuit to receive the timing signal;
the first capacitor having a first terminal and a second terminal coupled to a primary reference ground;
a first voltage source having a positive terminal and a negative terminal coupled to the primary reference ground;
a second voltage source having a positive terminal and a negative terminal coupled to the primary reference ground;

a first switch having a first terminal, a second terminal and a control terminal, wherein the first terminal is coupled to the first terminal of the first capacitor, and a second terminal is coupled to the positive terminal of the first voltage source, and the control terminal is coupled to the output terminal of the flip-flop;

a second switch having a first terminal, a second terminal and a control terminal, wherein the first terminal is coupled to the first terminal of the first capacitor, a second terminal is coupled to the positive terminal of the second voltage source through a first resistor, and the control terminal is coupled to the inverting output terminal of the flip-flop; and a sample-and-hold circuit configured to provide the first threshold voltage by sampling and holding the voltage across the first capacitor based on the first synchronous signal.

14. The isolated switching converter of claim 8, wherein the primary logic circuit is configured to turn on the primary switch when the second synchronous signal comes and a voltage across the primary switch reaches its resonant valley.

15. A control method used in an isolated switching converter, wherein the isolated switching converter has a primary switch coupled to a primary winding of a transformer, a secondary switch coupled to a secondary winding of the transformer, and an isolation circuit, the control method comprising:

providing an output feedback signal indicative of an output signal of the isolated switching converter;

providing a first compensation signal based on the difference between a reference voltage and the output feedback signal;

generating a first control signal and a second control signal based on the first compensation signal;

transmitting the first control signal to a first channel of the isolation circuit and providing a first synchronous signal electrically isolated from the first control signal;

transmitting the second control signal to a second channel of the isolation circuit and providing a second synchronous signal electrically isolated from the second control signal;

generating a first threshold voltage for controlling a peak value of a current flowing through the primary switch based on the first synchronous signal; and generating a turning-on control signal for controlling the switching frequency of the primary switch based on the second synchronous signal.

16. The control method of claim 15, further comprising:

generating a turning-off control signal by comparing a current sense signal indicative of the current flowing through the primary switch with the first threshold voltage; and providing a primary control signal for controlling the primary switch based on the turning-on control signal and the turning off control signal.

17. The control method of claim 15, wherein the method of generating the first control signal comprising:

generating a second compensation signal based on the first compensation signal;

providing a first comparison signal by comparing the second compensation signal with a modulation signal; and providing the first control signal based on the first comparison signal.

18. The control method of claim 17, wherein the method of generating the second control signal comprising:

comparing the first compensation signal with the modulation signal and providing a second comparison signal;

determining a target locked valley number based on a valley pulse signal corresponding to one or more valleys of a voltage drop across the secondary switch, the first comparison signal and the second comparison signal; and generating a second control signal corresponding to the target locked valley number for turning ON the primary switch.

19. The control method of claim 15, wherein the method of generating the first threshold voltage comprising:

when a rising edge of the second synchronous signal comes, a voltage across a first capacitor is set high to be an upper threshold voltage;

the voltage across the first capacitor begins to drop; and sampling and holding the voltage across the first capacitor to provide the first threshold voltage when the first synchronous signal comes.

20. The control method of claim 15, wherein the primary switch is turned on when the second synchronous signal comes and the voltage across the primary switch reaches its resonant valley.

* * * * *